US012610306B2

(12) United States Patent
Liu

(10) Patent No.: US 12,610,306 B2
(45) Date of Patent: Apr. 21, 2026

(54) CONFIGURATION INFORMATION TRANSMISSION METHOD, COMMUNICATION DEVICE

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 683 days.

(21) Appl. No.: 17/917,369

(22) PCT Filed: Apr. 8, 2020

(86) PCT No.: PCT/CN2020/083780
§ 371 (c)(1),
(2) Date: Oct. 6, 2022

(87) PCT Pub. No.: WO2021/203305
PCT Pub. Date: Oct. 14, 2021

(65) Prior Publication Data
US 2023/0164669 A1 May 25, 2023

(51) Int. Cl.
*H04W 48/08* (2009.01)
*H04W 68/00* (2009.01)
(Continued)

(52) U.S. Cl.
CPC ........... *H04W 48/08* (2013.01); *H04W 68/00* (2013.01); *H04W 74/006* (2013.01); *H04W 74/0833* (2013.01); *H04W 74/0836* (2024.01)

(58) Field of Classification Search
CPC ... H04W 48/08; H04W 68/00; H04W 74/006; H04W 74/0833; H04W 48/12;
(Continued)

(56) References Cited

U.S. PATENT DOCUMENTS

| | | | |
|---|---|---|---|
| 2017/0163401 A1 | 6/2017 | McNamara et al. | |
| 2022/0394664 A1* | 12/2022 | Xie ..................... | H04W 68/005 |

FOREIGN PATENT DOCUMENTS

| | | |
|---|---|---|
| CN | 103339894 A | 10/2013 |
| RU | 2650491 C1 | 4/2018 |
| (Continued) | | |

OTHER PUBLICATIONS

PCT/CN2020/083780 International Search Report dated Jan. 21, 2021, 2 pages.
(Continued)

*Primary Examiner* — Ayanah S George
(74) *Attorney, Agent, or Firm* — Cozen O'Connor

(57) ABSTRACT

Disclosed are a method for transmitting configuration information and a communication device. The method includes: sending, by a base station, configuration information respectively for a first type of user equipments (UEs) and a second type of UEs; an access configuration of the first type of UEs indicated by the configuration information is independent of an access configuration of the second type of UEs indicated by the configuration information; the access configuration of the first type of UEs is configured to be used by the first type of UEs for network access, and the access configuration of the second type of UEs is configured to be used by the second type of UEs for network access.

17 Claims, 5 Drawing Sheets

UE

Base station

S110: sending configuration information respectively for a first type of user equipments (UEs) and a second type of UEs, a maximum bandwidth supported by the first type of UEs is smaller than a maximum bandwidth supported by the second type of UEs, an access configuration of the first type of UEs indicated by the configuration information is independent of an access configuration of the second type of UEs indicated by the configuration information

(51) Int. Cl.
*H04W 74/00* (2009.01)
*H04W 74/0833* (2024.01)
*H04W 74/0836* (2024.01)

(58) Field of Classification Search
CPC ......... H04W 72/0453; H04W 74/0836; H04W 48/10; H04W 68/02; Y02D 30/70
See application file for complete search history.

(56) References Cited

FOREIGN PATENT DOCUMENTS

| WO | WO-2012104630 | A1 | * | 8/2012 | ........... H04W 72/23 |
|----|---------------|----|---|--------|----------------------|
| WO | WO 2019029510 | A1 |   | 2/2019 | |
| WO | WO 2019050316 | A1 |   | 2/2019 | |
| WO | WO 2019113785 | A1 |   | 6/2019 | |
| WO | WO 2020055041 | A1 |   | 3/2020 | |
| WO | WO-2020156559 | A1 | * | 8/2020 | ........... H04W 48/12 |
| WO | WO-2021156559 | A1 | * | 8/2021 | ............. F01D 5/142 |

OTHER PUBLICATIONS

Japanese Patent Application No. 2022-560049, Office Action dated Jun. 27, 2023, 3 pages.
Japanese Patent Application No. 2022-560049, English translation of Office Action dated Jun. 27, 2023, 3 pages.
Russian Patent Application No. 2022128624, Office Action dated Jul. 26, 2023, 7 pages.
Russian Patent Application No. 2022128624, English translation of Office Action dated Jul. 26, 2023, 6 pages.
Indian Patent Application No. 202247063413, Office Action dated Jan. 3, 2023, 6 pages.
European Patent Application No. 20929715.9, Search and Opinion dated Nov. 8, 2023, 11 pages.
Mediatek Inc. "Impact of Enhanced Coverage on System Information" 3GPP TSG-RAN2 #85 Meeting, R2-140525, Feb. 2014, 7 pages.
Ericsson "System information acquisition for low complexity and coverage enhanced UEs" 3GPP TSG RAN WG2 #89, R2-150454, Feb. 2015, 8 pages.
CATT "NR DL control channel structure" 3GPP TSG RAN WG1 AH_NR Meeting, R1-1700189, Jan. 2017, 3 pages.

* cited by examiner

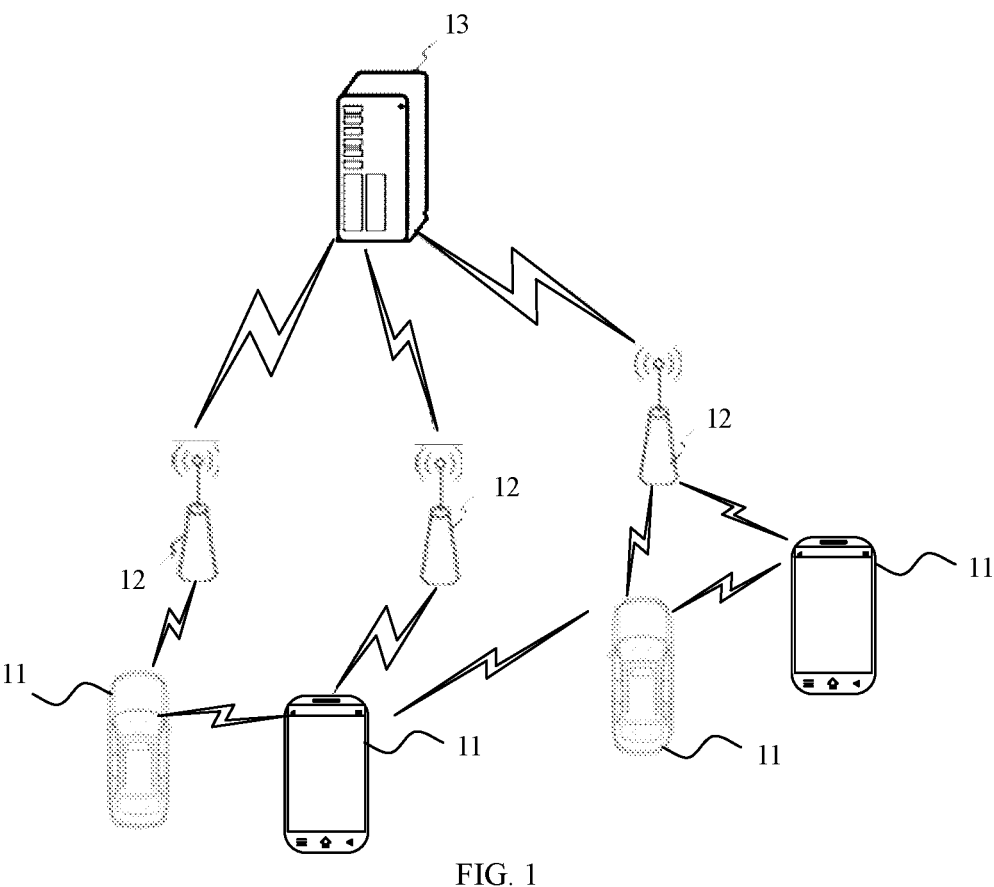

FIG. 1

| UE | | Base station |
|---|---|---|

S110: sending configuration information respectively for a first type of user equipments (UEs) and a second type of UEs, a maximum bandwidth supported by the first type of UEs is smaller than a maximum bandwidth supported by the second type of UEs, an access configuration of the first type of UEs indicated by the configuration information is independent of an access configuration of the second type of UEs indicated by the configuration information

FIG. 2

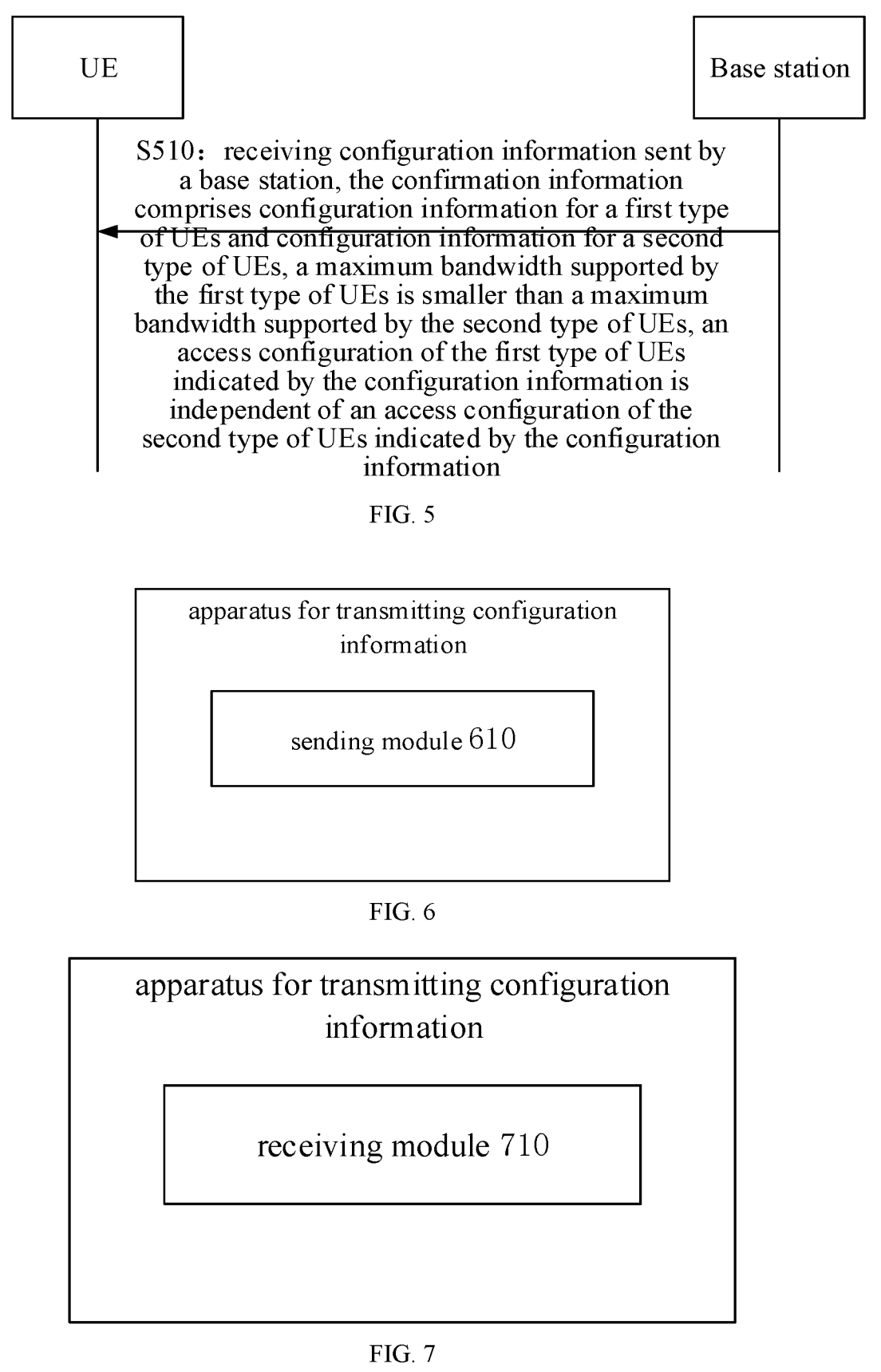

| UE | | Base station |
|---|---|---|

S510: receiving configuration information sent by a base station, the confirmation information comprises configuration information for a first type of UEs and configuration information for a second type of UEs, a maximum bandwidth supported by the first type of UEs is smaller than a maximum bandwidth supported by the second type of UEs, an access configuration of the first type of UEs indicated by the configuration information is independent of an access configuration of the second type of UEs indicated by the configuration information

FIG. 5 apparatus for transmitting configuration information sending module 610

FIG. 6 apparatus for transmitting configuration information receiving module 710

FIG. 7

CONFIGURATION INFORMATION TRANSMISSION METHOD, COMMUNICATION DEVICE

CROSS-REFERENCE TO RELATED APPLICATION

This application is a U.S. national phase of International Application No. PCT/CN2020/083780, filed with the State Intellectual Property Office of P. R. China on Apr. 8, 2020.

TECHNICAL FIELD

The disclosure relates to, but is not limited to, a field of communication technologies, and particularly to a method for transmitting information, an apparatus for transmitting information, a communication device and a storage medium.

BACKGROUND

At present, the 3rd generation partnership project (3GPP) carries out a project research on a reduced capability (RED-CAP) NR devices of the communication protocol release 17 (R17). An objective of the project is to reduce a complexity of a user equipment (UE) and save a cost of the UE in case of coexistence with the UEs of R15 or R16.

However, this has a high requirement on network. After the complexity of the terminal is reduced, a system coverage and the requirement on the system may be increased, so that a usage of wireless resources is decreased. In order to reduce effect on the network while reducing the complexity of the user equipment (UE), the prior art needs to be optimized.

From the view of initial bandwidth, downlink and uplink are configured in the remained minimum system information (RMSI). For a reduced capability UE, there may be two cases. In one case, the downlink configured in the RMSI is shared with an enhance mobile broadband (eMBB) UE. In the other case, a configuration of the RMSI is changed. If the reduced capability UE and the eMBB UE share the configuration of the same RMSI, how to ensure that the two type of UEs may access the network successfully with a fast access efficiency is a problem to be further solved.

SUMMARY

Embodiments of the disclosure provide a method for transmitting information, an apparatus for transmitting information, a communication device and a storage medium.

According to a first aspect of embodiments of the disclosure, a method for transmitting configuration information is provided. The method includes sending, by a base station, configuration information respectively for a first type of user equipments (UEs) and a second type of UEs. A first access configuration of the first type of UEs indicated by the configuration information is independent of a second access configuration of the second type of UEs indicated by the configuration information. The first access configuration of the first type of UEs is configured to be used by the first type of UEs for network access, and the second access configuration of the second type of UEs is configured to be used by the second type of UEs for network access.

According to a second aspect of the embodiments of the disclosure, a method for transmitting configuration information is provided. The method includes receiving, by a user equipment (UE), configuration information sent by a base station. The confirmation information includes configuration information for a first type of UEs and configuration information for a second type of UEs. A first access configuration of the first type of UEs indicated by the configuration information is independent of a second access configuration of the second type of UEs indicated by the configuration information. The first access configuration of the first type of UEs is configured to be used by the first type of UEs for network access, and the second access configuration of the second type of UEs is configured to be used by the second type of UEs for network access.

According to a third aspect of the embodiments of the disclosure, a communication device is provided. The device includes a processor, a transceiver, a memory and executable programs running on the processor. When the processor runs the executable programs, the method for transmitting configuration information according to any technical solution of the first aspect or the second aspect of the embodiments of the disclosure is performed.

BRIEF DESCRIPTION OF THE DRAWINGS

The accompanying drawings, which are incorporated in and constitute a part of this specification, illustrate embodiments consistent with the disclosure, and serve to explain the principles of the disclosure together with the specification.

FIG. 1 is a schematic diagram illustrating a wireless communication system according to an embodiment.

FIG. 2 is a flowchart illustrating a method for transmitting configuration information according to an embodiment.

FIG. 5 is a flowchart illustrating a method for transmitting configuration information according to an embodiment.

FIG. 6 is a block diagram illustrating an apparatus for transmitting configuration information according to an embodiment.

FIG. 7 is a block diagram illustrating an apparatus for transmitting configuration information according to an embodiment.

DETAILED DESCRIPTION

Figure 3:
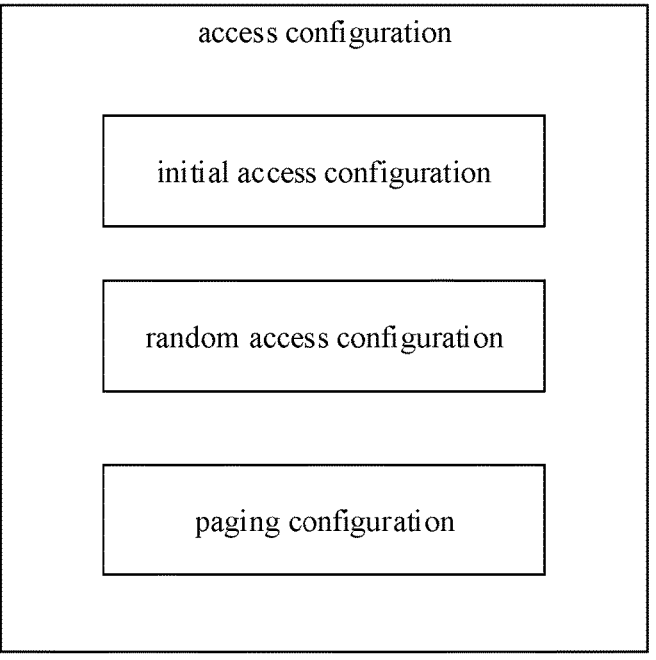
FIG. 3 is a schematic diagram illustrating an access configuration according to an embodiment.

The example embodiments will be described in detail here, and examples thereof are shown in the accompanying drawings. When the following descriptions refer to the accompanying drawings, unless otherwise indicated, the same numbers in different drawings represent the same or similar elements. The implementations described in the following example embodiments do not represent all the implementations consistent with the present invention. Rather, they are merely examples of the apparatus and method consistent with some aspects of the present invention as detailed in the appended claims.

The terms used in the embodiments of the disclosure are only for the purpose of describing particular embodiments, but should not be construed to limit the embodiments of the disclosure. As used in the description of the present disclosure and the appended claims, "a" and "the" in singular forms mean including plural forms, unless clearly indicated in the context otherwise. It should also be understood that, as used herein, the term "and/or" represents and contains any one and all possible combinations of one or more associated listed items.

It should be further understood that, although terms such as "first", "second" and "third" are used herein for describing various elements, these elements should not be limited by these terms. These terms are only used for distinguishing one element from another element. For example, first information may also be called second information, and similarly, the second information may also be called the first information, without departing from the scope of the present disclosure. As used herein, the term "if" may be construed to mean "when" or "upon" or "in response to determining" or "in accordance with a determination" or "in response to detecting," that a stated condition precedent is true, depending on the context.

With reference to FIG. 1, FIG. 1 is a schematic diagram illustrating a wireless communication system according to an embodiment of the disclosure. As illustrated in FIG. 1, the wireless communication system is a communication system based on the cellular mobile communication technology. The wireless communication system may include several UEs 11 and several base stations 12.

The UE 11 may be a device that provides voice and/or data connectivity to a user. The UE 11 can communicate with one or more core networks via a radio access network (RAN). The UE 11 can be an IoT UE, such as a sensor device, a mobile phone (or a cellular phone), and a computer having an IoT UE, for example, a fixed, portable, pocket-sized, handheld, built-in computer or vehicle-mounted device, such as, a station (STA), a subscriber unit, a subscriber station, a mobile station, a mobile, a remote station, an access point, a remote terminal, an access terminal, a user terminal, a user agent, or a user equipment (UE). Alternatively, the UE 11 may also be a device of an unmanned aerial vehicle. Alternatively, the UE 11 may also be an in-vehicle device, for example, the UE 11 may be a vehicle-mounted computer with a wireless communication function, or a wireless communication device externally connected to a vehicle-mounted computer. Alternatively, the UE 11 may also be a roadside device, for example, a road light with a wireless communication function, a traffic light or other roadside devices and so on.

The base station 12 may be a network side device in the wireless communication system. The wireless communication system may be a 4th generation mobile communication (4G) system, also known as the long term evolution (LTE) system. The wireless communication system may be a 5G system, also known as the new radio (NR) system or 5G NR system. Alternatively, the wireless communication system may also be a next-generation system of the 5G system. An access network in the 5G system may be called as a new generation radio access network (NG-RAN), or a machine-type communication (MTC) system.

The base station 12 may be a base station (eNB) adopting a centralized and distributed architecture in the 4G system. Alternatively, the base station 12 may be a base station (gNB) adopting a centralized and distributed architecture in the 5G system. When the base station 12 adopts the centralized and distributed architecture, it generally includes a central unit (CU) and at least two distributed units (DUs). The CU is provided with a protocol stack including a packet data convergence protocol (PDCP) layer, a radio link control (RLC) layer, and a media access control (MAC) layer. The DU is provided with a protocol stack including a physical (PHY) layer, and the embodiment of the disclosure does not limit the specific implementation manner of the base station 12.

A wireless connection can be established between the base station 12 and the UE 11 through a wireless air interface. In different embodiments, the wireless air interface is a wireless air interface based on the 4G standard. Alternatively, the wireless air interface is a wireless air interface based on the 5G standard. For example, the wireless air interface is the NR. Alternatively, the wireless air interface can also be a wireless air interface based on a standard of next generation mobile communication network technology based on the 5G.

In some embodiments, an end to end (E2E) connection can be established between the UEs 11, for example a vehicle to vehicle (V2V) communication, a vehicle to infrastructure (V2I) communication, vehicle to pedestrian (V2P) communication and other scenarios in the vehicle to everything (V2X) communication.

Alternatively, the wireless communication system may further include a network management device 13.

A plurality of the base stations 12 are connected to the network management device 13 respectively. The network management device 13 may be a core network device in the wireless communication system. For example, the network management device 13 may be a mobility management entity (MME) of an evolved packet core (EPC) network. Alternatively, the network management device may also be other core network devices, such as a serving gateway (SGW), a public data network gateway (PGW), and a policy and charging rules function (PCRF) unit or a home subscriber server (HSS). The implementation form of the network management device 13 is not limited in the embodiment of the disclosure.

As illustrated in FIG. 2, the embodiments of the disclosure provide a method for transmitting initial bandwidth configuration information. The method is applied in a base station and includes the following.

At block S11, configuration information respectively for a first type of UEs and a second type of UEs is sent. An access configuration of the first type of UEs indicated by the configuration information is independent of an access configuration of the second type of UEs indicated by the configuration information.

The access configuration of the first type of UEs is configured to be used by the first type of UEs for network access, and the access configuration of the second type of UEs is configured to be used by the second type of UEs for network access.

The first type of UEs and the second type of UEs in the embodiment of the disclosure are different types of terminals. Here, the first type of UEs and the second type of UEs may be UEs sharing a same physical broadcast channel (PBCH).

In some embodiments, the first type of UE may be a terminal of R17. The second type of UE may be a terminal of R16 or a terminal of R15. The first type of UE may be a reduced capability NR device, which may be called Redcap UE in short. The second type of UE may include an eMBB UE.

In application, the first type of UEs and the second type of UEs may be distinguished through an identity (ID) of the UE.

Here, a maximum bandwidth supported by the first type of UEs is smaller than a maximum bandwidth supported by the second type of UEs.

For example, the maximum bandwidth supported by the second type of UEs may be 100 Mhz, and the maximum bandwidth supported by the first type of UEs is less than 100 Mhz. The first type of UEs may be further classified into some subclasses based on the maximum bandwidth supported. For example, the first type of UEs supporting the maximum bandwidth of 40 Mhz are classified to a first subclass, the first type of UEs supporting the maximum bandwidth of 20 Mhz are classified to a second subclass, and the first type of UEs supporting the maximum bandwidth of 10 Mhz are classified to a third subclass. The above classification of the subclasses is merely exemplary. The classification of the subclasses of the first type of UEs is not limited to this, but can be set according to specific requirements.

The classic first type of UEs include but are not limited to industry sensors, monitoring devices, medical facilities, or wearable devices.

The first type of UEs and the second type of UEs have configuration information independent of each other. The configuration information is configured to control the first type of UEs and the second type of UEs to access a network. Here, the network to which the first type of UEs and the second type of UEs can access includes but is not limited to a 5G network, a 4G network, a 2G network or a 3G network.

Here, both the access configuration of the first type of UEs and the access configuration of the second type of UEs are used by the UEs for network access. As illustrated in FIG. 3, the access configuration includes but is not limited to any of the following: an initial access configuration, a random access configuration or a paging configuration. The paging configuration at least includes a paging configuration for sending a paging message.

The initial access configuration is used by the UE for initial access. The random access configuration is used by the UE for random access. The paging configuration is configured to send a paging message to the UE in an idle state or an inactive state so as to trigger the UE to access through the paging message.

The initial access refers to a process starting from a terminal starting up for the first time and reading system information to completing initiating of random access.

After the initial access, the UE establishes a downlink with a base station, and the UE may receive configurations for the UE to perform other random accesses (for example, here, the other random accesses include but are not limited to subsequent random accesses after the first time of starting up) sent by the base station.

The random access configuration may include a configuration of random access resources and/or a configuration of random access parameters. The random access parameters may indicate at least one of the following: a random access mode, access configuration information, including but being not limited to a preamble sequence of the random access, or a number of repetitions of the random access. For example, the random access configuration may include one or more of a 2-step random access configuration (rach-ConfigCommonTwoStepRA), a physical uplink shared channel configuration of the random access message A (msgA-PUSCH-Config), a physical uplink control channel configuration of the random access message B (MsgB-PUCCH-Config), a modulation coding scheme of the random access message A (msgA-MCS) and a demodulation reference signal configuration of the random access message B (MsgB-DMRS-Config). The above listed items are merely exemplary. The random access configuration may also be various parameters related to the random access in rach-ConfigCommon.

The random access is a network access mode that the UE actively initiates.

Given that the first type of UEs and the second type of UEs support different maximum bandwidths, independent configurations are applicable to the configuration information of the first type of UEs and the second type of UEs, so as to separately control access of the first type of UEs and the second type of UEs. The compatibility of the first type of UEs and the existing communication system may be achieved. The characteristics of low power consumption and low complexity of the first type of UEs can be fully utilized to realize communication with low power consumption.

If the random access of the first type of UEs is not distinguished from the random access of the second type of UEs, in order to reduce a transmission capability of the second type of UEs, the second type of UEs may be configured to access on a bigger bandwidth. In this case, if the first type of UEs supporting a small bandwidth and the second type of UEs share the same access configuration, a situation where the bandwidth in the access configuration is greater than the maximum bandwidth supported by the first type of UEs may occur, thus causing an access failure of the first type of UE. However, if the access configuration of the second type of UEs is configured to fit the access configuration of the first type of UEs under consideration of the characteristic of the small supported bandwidth of the first type of UEs, the transmission capability of the second type of UEs cannot be fully utilized, or even a phenomena that the second type of UEs have low access efficiency and slow transmission rate may take place.

In the embodiments of the disclosure, in order to ensure an access success rate of the first type of UEs and not affect the capability of the second type of UEs supporting a wide bandwidth to the maximum extent, independent access configurations are configured for the first type of UEs and the second type of UEs, and the access configurations of the first type of UEs and the second type of UEs are respectively indicated by configuration information.

In the embodiments of the disclosure, the access configuration may include: an uplink access configuration and a downlink access configuration. The uplink access configuration is used for an uplink transmission during an access process of the UE. The downlink access configuration is used for a downlink transmission during an access process of the UE. The classic uplink access configuration may include a random access configuration. The classic downlink access configuration may include a paging configuration. The paging configuration at least includes a paging occasion configuration.

The access configuration of the first type of UEs indicated by the configuration information being independent of the access configuration of the second type of UEs includes: an uplink access configuration of the first type of UEs indicated by the configuration information being different from an uplink access configuration of the second type of UEs, and/or a downlink access configuration of the first type of UEs indicated by the configuration information being different from a downlink access configuration of the second type of UEs.

In some embodiments, the access configuration of the first type of UEs being independent of the access configuration of the second type of UEs includes: an initial access configuration of the first type of UEs being different from an initial access configuration of the second type of UEs.

The access configuration of the first type of UEs being independent of the access configuration of the second type of UEs includes: the two types of UEs have different initial access configurations. In this way, the initial access may be configured for the two types of UEs respectively based on the capabilities of the first type of UEs and the second type of UEs in an initial access phase of the two types of UEs.

In some embodiments, the initial access configuration includes an initial bandwidth part (BWP) configuration. The access configuration of the first type of UEs being independent of the access configuration of the second type of UEs includes an initial BWP configuration of the first type of UEs being different from an initial BWP configuration of the second type of UEs. In this case, the initial BWP configuration indicates an initial BWP. For example, the first type of UEs and the second type of UEs use different initial BWPs for initial access. Different initial BWPs have different center frequencies. For example, a bandwidth of the initial BWP corresponding to the initial BWP configuration for the first type of UEs is smaller than that of the initial BWP corresponding to the initial BWP configuration for the second type of UEs. Here, the initial BWP of each type of the first type of UEs and the second type of UEs may include an initial uplink BWP and an initial downlink BWP. The initial uplink BWP is used to send uplink information during the initial access process. The initial downlink BWP is used to send downlink information during the initial access process.

The initial BWP configuration of the first type of UEs being different from an initial BWP configuration of the second type of UEs includes: an initial uplink BWP configuration of the first type of UEs being different from the initial uplink BWP configuration of the second type of UEs; an initial downlink BWP configuration of the first type of UEs being different from the initial downlink BWP configuration of the second type of UEs.

In some embodiments, the two types of UEs have a same initial BWP configuration, but use different BWP access resources. In this case, the access configuration of the first type of UEs being independent of the access configuration of the second type of UEs includes the first type of UEs and the second type of UEs having a same initial BWP configuration indicating different access resources on a same initial BWP.

In this case, the first type of UEs and the second type of UEs have the same BWP configuration, i.e., using the same BWP. For example, the first type of UEs and the second type of UEs use the same initial uplink BWP1, but the first type of UEs and the second type of UEs use different frequency resources or time domain resources in the initial uplink BWP1. For another example, the first type of UEs and the second type of UEs use the same initial downlink BWP2, but the first type of UEs and the second type of UEs use different frequency resources or time domain resources in the initial downlink BWP2.

In some embodiments, the initial access configuration includes an initial bandwidth part (BWP) configuration. The access configuration of the first type of UEs being independent of the access configuration of the second type of UEs includes an initial BWP configuration of the first type of UEs and an initial BWP configuration of the second type of UEs being the same in part and different in the remaining part. In detail, the initial BWP configurations of the first type of UEs and the second type of UEs have the same uplink initial BWP configuration and different downlink initial BWP configurations, or the initial BWP configurations of the first type of UEs and the second type of UEs have the same downlink initial BWP configuration and different uplink initial BWP configurations.

For example, the initial uplink BWP of the first type of UEs and the initial uplink BWP of the second type of UEs are both BWP0, but the initial downlink BWP of the first type of UEs is BWP1-1 and the initial downlink BWP of the second type of UEs is BWP1-2. For another example, the initial uplink BWP of the first type of UEs and the initial uplink BWP of the second type of UEs are both BWP2, but the initial downlink BWP of the first type of UEs is BWP2-1 and the initial downlink BWP of the second type of UEs is BWP2-2.

In some embodiments, the initial access configuration includes a random access configuration for random access. Here, the random access configuration mainly relates to a resource occupied by the random access of the UE, i.e., the random access configuration is one kind of uplink access configuration described above.

The access configuration of the first type of UEs indicated by the configuration information being independent of the access configuration of the second type of UEs includes a random access configuration of the first type of UEs being different from a random access configuration of the second type of UEs.

The random access configurations are different, then the first type of UEs and the second type of UEs may initiate the random access on different random access resources. The random parameters used in the random access process may be different. For example, the random access preambles used in the random access are different. Assume that the random access configuration indicates the random access preamble set A corresponding to the first type of UEs, and the random access configuration indicates the random access preamble set B corresponding to the second type of UEs. The set A includes a random access preamble 1, a random access preamble 2, a random access preamble 3 . . . and a random access preamble N. The set B includes a random access preamble N+1, a random access preamble N+2, a random access preamble N+3 . . . and a random access preamble N+M. N and M are natural numbers including 0 or positive integers.

For another example, in different random access processes, the UE may send different numbers of random access requests, i.e., different random access processes include different numbers of repetitions of random access. In order to ensure a success rate of the random access of the first type of UEs, the number of repetitions of random access of the first type of UEs indicted by the random access configuration may be higher than the number of repetitions of random access of the second type of UEs. The number of repetitions of random access of the second type of UEs may be 1, i.e., the second type of UE is allowed to initiate only one random access during one random access process. The above is merely exemplary, the specific implementation is not limited to this.

In some embodiments, the initial access configuration includes a configuration of random access resources.

The random access configuration includes 2-step random access. During a 2-step random access process, a terminal may send a random access message (Msg) A and MsgB to complete the random access.

In some embodiments, the random access configuration may further include a 4-step random access configuration. The random access process is completed through transmissions of Msg1 to Msg4.

In some embodiments, the above mentioned downlink access configuration may at least include a configuration of a paging message during a paging access process. The access configuration of the first type of UEs being independent of the access configuration of the second type of UEs includes a paging configuration of the first type of UEs being different from a paging configuration of the second type of UEs.

The access configuration includes a paging configuration for sending a paging message. The paging configuration of the paging message includes a configuration of a sending occasion of the paging message. In other embodiments, the paging configuration of the paging message may further include a configuration of a paging occasion of issuing the paging message and/or a configuration of a paging frame carrying the paging message. A moving range of the first type of UEs may be smaller than a moving range of the second type of UEs, or a mobility of the first type of UEs is lower than a mobility of the second type of UEs. Based on such characteristics, independent access configurations may be used to configure a smaller number of paging occasions for the first type of UEs than the second type of UEs, so as to reduce unnecessary signaling overhead of the paging message and unnecessary configurations of paging resources at the base station side.

For example, the paging configuration of the first type of UEs being different from the paging configuration of the second type of UEs includes a paging occasion for paging the first type of UEs indicated by the paging configuration of the first type of UEs being different from a paging occasion for paging the second type of UEs.

Considering that the first type of UEs and the second type of UEs may have different paging frequencies, the paging occasions being different includes at least one of the following.

The paging occasions of the first type of UEs and the second type of UEs correspond to different time domain resources.

The paging occasions of the first type of UEs and the second type of UEs correspond to different frequency domain resources.

A time interval between two adjacent paging occasions of the first type of UEs is different from a time interval between two adjacent paging occasions of the second type of UEs. For example, the time interval between two adjacent paging occasions of the first type of UEs may be greater than the time interval between two adjacent paging occasions of the second type of UEs. By increasing the time interval between two adjacent paging occasions of the first type of UE, a frequency of the paging occasions of the first type of UE is decreased, and a frequency that the first type of UE entering an awake state monitors the paging message is further decreased, so that a power consumption of the first type of UE is further reduced. The above is merely exemplary, and the specific implementations are not limited to this.

In some embodiments, sending the configuration information respectively for the first type of UEs and the second type of UEs includes sending a system information block SIB1. The SIB1 carries the configuration information respectively for the first type of UEs and the second type of UEs.

Here, the SIB1 is an appellation of a signaling layer. The content contained by the SIB1 is carried in remaining minimum system information (RMSI) of a physical layer.

The first type of UEs and the second type of UEs may share the same PBCH, and the first type of UEs and the second type of UEs may listen into resource position information of the SIB1 on the PBCH. After listening into the resource position information of the SIB1, the SIB1 is received at the corresponding resource position. In this case, SIB1 may carry the configuration information both for the first type of UEs and the second type of UEs.

In this way, after the first type of UEs and the second type of UEs acquire the resource position information of the SIB1 through listening on the PBCH, the first type of UEs and the second type of UEs listen into the SIB1, so as to listen into the respective configuration information for the access configuration.

In some embodiments, the configuration information of the first type of UEs and the configuration information of the second type of UEs indicate different uplink access configurations for access.

Figure 4:
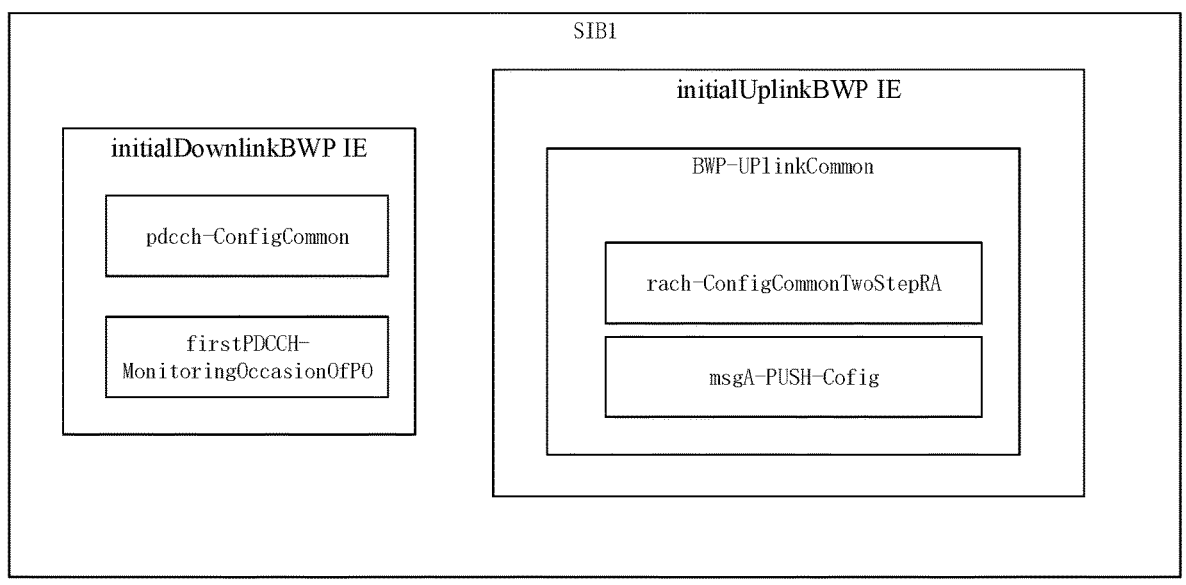
FIG. 4 is a schematic diagram illustrating a SIB1 according to an embodiment.

As illustrated in FIG. 4, the SIB1 includes an initial uplink BWP information element (IE).

The configuration information for the first type of UEs and the configuration information for the second type of UEs are carried by different initial uplink BWP IEs. The initial uplink BWP IE may be referred to as initialUplinkBWP IE.

In the related art, the SIB1 includes an initial uplink BWP IE. Since the access configuration of the first type of UEs is independent of the access configuration of the second type of UEs, different initial uplink BWP IEs may be used to respectively carry the access configurations of the first type of UEs and the second type of UEs.

If the first type of UEs and the second type of UEs correspond to different initial uplink BWP IEs, the SIB1 may include the configuration information for the access configurations of the first type of UEs and the second type of UEs, respectively.

In some embodiments, the configuration information of the first type of UEs and the configuration information of the second type of UEs indicate different uplink access configurations for access. The SIB1 includes the initial uplink BWP IE.

The configuration information for the first type of UEs and the configuration information for the second type of UEs are carried by a same initial uplink BWP IE, and the same initial uplink BWP IE includes different random access channel common configurations for the first type of UEs and the second type of UEs.

The access configuration of the first type of UEs is independent of the access configuration of the second type of UEs, but the access configuration of the first type of UEs has some configuration values the same as the access configuration of the second type of UEs. In this case, in order to reduce the signaling overhead of the SIB1, the SIB1 may merely carry one initial uplink BWP IE, but the initial uplink BWP IE includes different random access channel common configurations. In other words, the initial uplink BWP IE for both the first type of UEs and the second type of UEs carries two random access channel common configurations, one of which is the access configuration of the first type of UEs, and the other of which is the access configuration of the second type of UEs.

The random access channel common configuration may be called rach-ConfigCommon in short. Further, the random access channel common configuration may refer to rach-ConfigCommonTwoStepRA in some embodiments.

In other embodiments, the initial uplink BWP IE carrying the configuration information of the first type of UEs is the same as the initial uplink BWP IE carrying the configuration information of the second type of UEs, and the initial uplink BWP IE includes different physical uplink shared channel (PUSCH) random access message A (MsgA) configurations for the first type of UEs and the second type of UEs. The PUSCH MsgA configuration may be called msgA-PUSCH-ConfigCommon in short.

By carrying the independent access configurations of the first type of UEs and the second type of UEs in this way, the bit overhead in the SIB1 may be reduced to the maximum extent and a high compatibility with the related art may be achieved.

In some embodiments, the configuration information of the first type of UEs and the configuration information of the second type of UEs indicate different downlink access configurations for access. The SIB1 includes an initial downlink BWP IE.

The configuration information for the first type of UEs and the configuration information for the second type of UEs are carried by different initial downlink BWP IEs.

The initial downlink BWP IE may be called initialDown-linkBWP IE.

In the embodiment, the configuration information of the first type of UEs and the configuration information of the second type of UEs are carried by different initial downlink BWP IEs in the same SIB1. In this way, the configuration information of the first type of UEs and the configuration information of the second type of UEs are separated from the level of initial downlink BWP IE.

In some other embodiments, the configuration information of the first type of UEs and the configuration information of the second type of UEs are carried by a same initial downlink BWP IE, and the initial downlink BWP IE includes different common PDCCH configurations for the first type of UEs and the second type of UEs.

The common PDCCH configuration may be called pdcch-ConfigCommon configuration.

In the embodiment, the configuration information of the first type of UEs and the configuration information of the second type of UEs are carried by the same initial downlink BWP IE in the same SIB1. The configuration information of the first type of UEs and the configuration information of the second type of UEs are distinguished by the different common PDCCH configurations of the first type of UEs and the second type of UEs carried by the same initial downlink BWP IE in the same SIB1. The initial downlink BWP IE carries common PDCCH configurations respectively for the first type of UEs and the second type of UEs, so as to reduce the bit overhead of the SIB1 as more as possible.

In some embodiments, the configuration information of the first type of UEs and the configuration information of the second type of UEs are carried by the same initial downlink BWP IE, the initial downlink BWP IE includes a same common PDCCH configuration for the first type of UEs and the second type of UEs, and the common PDCCH configuration includes different parameter values for downlink access configurations of the first type of UEs and the second type of UEs.

In the embodiment, the configuration information of the first type of UEs and the configuration information of the second type of UEs are carried by the same initial downlink BWP IE in the same SIB1. The configuration information of the first type of UEs and the configuration information of the second type of UEs are distinguished by the common PDCCH configuration with downlink access configurations respectively for the first type of UEs and the second type of UEs carried by the same initial downlink BWP IE in the same SIB1.

For example, in the common PDCCH configuration, the same parameter value in the configuration information of the first type of UEs and the second type of UEs may be shared by the first type of UEs and the second type of UEs, while the different parameter values in the configuration information of the first type of UEs and the second type of UEs are respectively recorded. In this way, the bit overhead may be reduced as more as possible.

Here, different parameter values of the downlink access configurations may be different configurations of the paging occasion. For example, the configuration of the paging occasion may be called firstPDCCH-MonitoringOccasion-OfPO configuration.

As illustrated in FIG. 5, a method for transmitting configuration information is provided according to an embodiment of the disclosure. The method is applied in a user equipment (UE). The method includes the following.

At block S510, configuration information sent by a base station is received. The confirmation information includes configuration information for a first type of UEs and configuration information for a second type of UEs.

An access configuration of the first type of UEs indicated by the configuration information is independent of an access configuration of the second type of UEs indicated by the configuration information.

The access configuration of the first type of UEs is configured to be used by the first type of UEs for network access, and the access configuration of the second type of UEs is configured to be used by the second type of UEs for network access.

Here, the UE may the first type of UE or the second type of UE. Regardless of whether the UE is the first type of UE or the second type of UE, the UE can receive the configuration information sent by the base station. The first type of UEs and the second type of UEs can extract the configuration information sent by the base station for themselves from the received configuration information based on a detection rule and their own types.

In some embodiments, a maximum bandwidth supported by the first type of UEs is smaller than a maximum bandwidth supported by the second type of UEs.

If the receiving UE is the first type of UE, network access is performed based on the configuration information of the first type of UEs.

If the receiving UE is the second type of UE, network access is performed based on the configuration information of the second type of UEs.

In the embodiments of the disclosure, the configuration information of the first type of UEs and the configuration information of the second type of UEs are configured independently, which can be embodied in that at least part of the configuration information of the first type of UEs and at least part of the configuration information of the second type of UEs are different. In order to realize mutual independency between the configuration information of the first type of UEs and the configuration information of the second type of UEs, when the base station sends the configuration information, a same bit may be used to indicate a same configuration value (or called parameter value) in the configuration information of the first type of UEs and the configuration information of the second type of UEs, while different configuration values (or called parameter values) in the configuration information of the first type of UEs and the configuration information of the second type of UEs are indicated respectively. For example, different bits in SIB1 are used to respectively indicate different configuration values of the first type of UEs and the second type of UEs.

In some embodiments, the access configuration of the first type of UEs being independent of the access configuration of the second type of UEs includes: an initial access configuration of the first type of UEs being different from an initial access configuration of the second type of UEs.

The access configurations of the first type of UEs and the second type of UEs are independent of each other, which can be embodied in at least one or more of the followings according to the access process: initial access configurations being different, random access configurations being different, paging configurations being different.

According to an uplink transmission and a downlink transmission of the access configuration, the access configurations of the first type of UEs and the second type of UEs are independent of each other, which can be embodied in at least one or more of the followings: uplink access configurations being different; downlink access configurations being different.

In some embodiments, the initial access configuration includes an initial bandwidth part (BWP) configuration. The access configuration of the first type of UEs being independent of the access configuration of the second type of UEs includes an initial BWP configuration of the first type of UEs being different from an initial BWP configuration of the second type of UEs; or the first type of UEs and the second type of UEs having a same initial BWP configuration indicating different access resources on a same initial BWP; or an initial BWP configuration of the first type of UEs and an initial BWP configuration of the second type of UEs being the same in part and different in the remaining part.

In some embodiments, the initial BWP configuration of the first type of UEs and the initial BWP configuration of the second type of UEs being the same in part and different in the remaining part includes: the initial BWP configuration of the first type of UEs and the initial BWP configuration of the second type of UEs having a same uplink initial BWP configuration and different downlink initial BWP configurations; or the initial BWP configuration of the first type of UEs and the initial BWP configuration of the second type of UEs having a same downlink initial BWP configuration and different uplink initial BWP configurations.

In some embodiments, the access configuration includes a random access configuration for random access. The access configuration of the first type of UEs indicated by the configuration information being independent of the access configuration of the second type of UEs includes a random access configuration of the first type of UEs being different from a random access configuration of the second type of UEs.

In some embodiments, the random access configuration includes a configuration of random access resources.

In some embodiments, the random access configuration includes a random access configuration for 2-step random access.

In some embodiments, the access configuration includes a paging configuration for sending a paging message.

The access configuration of the first type of UEs indicated by the configuration information being independent of the access configuration of the second type of UEs includes: a paging configuration of the first type of UEs being different from a paging configuration of the second type of UEs.

In some embodiments, the paging configuration of the first type of UEs being different from the paging configuration of the second type of UEs includes: a paging occasion for paging the first type of UEs indicated by the paging configuration of the first type of UEs being different from a paging occasion for paging the second type of UEs.

In some embodiments, receiving the configuration information sent by the base station includes receiving a system information block SIB1, in which the SIB1 carries the configuration information respectively for the first type of UEs and the second type of UEs.

The SIB1 is carried in RMSI of a physical layer.

Both the configuration information of the first type of UEs and the configuration information of the second type of UEs are carried in the SIB1. The UE may receive the configuration information of the two types of UEs through receiving the SIB1, and detect a configuration rule applicable to itself based on a known sending rule (corresponding to the above mentioned detection rule) of the base station sending the configuration of the two types of UEs. If the UE currently receiving the SIB1 is the first type of UE, the configuration information of the first type of UEs may be extracted from the SIB1 based on the detection rule. If the UE currently receiving the SIB1 is the second type of UE, the configuration information of the second type of UEs may be detected.

In some embodiments, the configuration information for the first type of UEs and the configuration information for the second type of UEs indicate different uplink access configurations for access. The SIB1 includes an initial uplink BWP information element (IE). The configuration information for the first type of UEs and the configuration information for the second type of UEs are carried by different initial uplink BWP IEs.

In some embodiments, the configuration information for the first type of UEs and the configuration information for the second type of UEs indicate different uplink access configurations for access. The SIB1 includes an initial uplink BWP information element (IE). The configuration information for the first type of UEs and the configuration information for the second type of UEs are carried by a same initial uplink BWP IE, and the same initial uplink BWP IE includes different random access channel common configurations for the first type of UEs and the second type of UEs. And/or, the configuration information for the first type of UEs and the configuration information for the second type of UEs are carried by a same initial uplink BWP IE, and the same initial uplink BWP IE includes different physical uplink shared channel (PUSCH) random access message A (MsgA) configurations for the first type of UEs and the second type of UEs. Here, the MsgA is a random access message for the 2-step random access.

In some embodiments, the configuration information for the first type of UEs and the configuration information for the second type of UEs indicate different downlink access configurations for access. The SIB1 includes an initial downlink BWP information element (IE). The configuration information for the first type of UEs and the configuration information for the second type of UEs are carried by different initial downlink BWP IEs. Or, the configuration information for the first type of UEs and the configuration information for the second type of UEs are carried by a same initial downlink BWP IE, and the same initial downlink BWP IE includes different common physical downlink control channel (PDCCH) configurations for the first type of UEs and the second type of UEs. Or, the configuration information for the first type of UEs and the configuration information for the second type of UEs are carried by a same initial downlink BWP IE, the same initial downlink BWP IE includes a same common PDCCH configuration for the first type of UEs and the second type of UEs, and the same common PDCCH configuration has different parameter values for downlink access configurations of the first type of UEs and the second type of UEs.

As illustrated in FIG. 6, an apparatus for transmitting configuration information is provided according to an embodiment of the disclosure. The apparatus is applied in a base station. The apparatus includes a sending module 610.

The sending module 610 is configured to send configuration information respectively for a first type of user equipments (UEs) and a second type of UEs.

An access configuration of the first type of UEs indicated by the configuration information is independent of an access configuration of the second type of UEs indicated by the configuration information.

The access configuration of the first type of UEs is configured to be used by the first type of UEs for network access, and the access configuration of the second type of UEs is configured to be used by the second type of UEs for network access.

In some embodiments, a maximum bandwidth supported by the first type of UEs is smaller than a maximum bandwidth supported by the second type of UEs.

In some embodiments, the sending module 610 may be a program module. The program module is executed by a processor, to implement sending configuration information respectively for a first type of user equipments (UEs) and a second type of UEs.

In some embodiments, the sending module 610 may be a software and hardware combined module, which may include various programmable arrays, including but be not limited to a complex programmable array or a field programmable array.

In further embodiments, the sending module 610 may be a pure hardware module, which may include but be not limited to an application-specific integrated circuit.

In some embodiments, the access configuration of the first type of UEs being independent of the access configuration of the second type of UEs includes an initial access configuration of the first type of UEs being different from an initial access configuration of the second type of UEs.

In some embodiments, the initial access configuration includes an initial bandwidth part (BWP) configuration. The access configuration of the first type of UEs being independent of the access configuration of the second type of UEs includes: an initial BWP configuration of the first type of UEs being different from an initial BWP configuration of the second type of UEs; or the first type of UEs and the second type of UEs having a same initial BWP configuration indicating different access resources on a same initial BWP; or an initial BWP configuration of the first type of UEs and an initial BWP configuration of the second type of UEs being the same in part and different in the remaining part.

In some embodiments, the initial BWP configuration of the first type of UEs and the initial BWP configuration of the second type of UEs being the same in part and different in the remaining part includes: the initial BWP configuration of the first type of UEs and the initial BWP configuration of the second type of UEs having a same uplink initial BWP configuration and different downlink initial BWP configurations; or the initial BWP configuration of the first type of UEs and the initial BWP configuration of the second type of UEs having a same downlink initial BWP configuration and different uplink initial BWP configurations.

In some embodiments, the access configuration includes a random access configuration for random access. The access configuration of the first type of UEs indicated by the configuration information being independent of the access configuration of the second type of UEs includes a random access configuration of the first type of UEs being different from a random access configuration of the second type of UEs.

In some embodiments, the random access configuration includes a configuration of random access resources.

In some embodiments, the random access configuration includes a random access configuration for 2-step random access.

In some embodiments, the access configuration includes a paging configuration for sending a paging message.

The access configuration of the first type of UEs indicated by the configuration information being independent of the access configuration of the second type of UEs includes a paging configuration of the first type of UEs being different from a paging configuration of the second type of UEs.

In some embodiments, the paging configuration of the first type of UEs being different from the paging configuration of the second type of UEs includes a paging occasion for paging the first type of UEs indicated by the paging configuration of the first type of UEs being different from a paging occasion for paging the second type of UEs.

In some embodiments, sending the configuration information respectively for the first type of UEs and the second type of UEs includes sending a system information block SIB1, in which the SIB1 carries the configuration information respectively for the first type of UEs and the second type of UEs.

In some embodiments, the configuration information for the first type of UEs and the configuration information for the second type of UEs indicate different uplink access configurations for access. The SIB1 includes an initial uplink BWP information element (IE).

The configuration information for the first type of UEs and the configuration information for the second type of UEs are carried by different initial uplink BWP IEs.

In some embodiments, the configuration information for the first type of UEs and the configuration information for the second type of UEs indicate different uplink access configurations for access. The SIB1 includes an initial uplink BWP information element (IE).

The configuration information for the first type of UEs and the configuration information for the second type of UEs are carried by a same initial uplink BWP IE, and the same initial uplink BWP IE includes different random access channel common configurations for the first type of UEs and the second type of UEs.

And/or the configuration information for the first type of UEs and the configuration information for the second type of UEs are carried by a same initial uplink BWP IE, and the same initial uplink BWP IE includes different physical uplink shared channel (PUSCH) random access message A (MsgA) configurations for the first type of UEs and the second type of UEs. The MsgA is a random access message for the 2-step random access.

In some embodiments, the configuration information for the first type of UEs and the configuration information for the second type of UEs indicate different downlink access configurations for access. The SIB1 includes an initial downlink BWP information element (IE).

The configuration information for the first type of UEs and the configuration information for the second type of UEs are carried by different initial downlink BWP IEs.

Or, the configuration information for the first type of UEs and the configuration information for the second type of UEs are carried by a same initial downlink BWP IE, and the same initial downlink BWP IE includes different common physical downlink control channel (PDCCH) configurations for the first type of UEs and the second type of UEs.

Or, the configuration information for the first type of UEs and the configuration information for the second type of UEs are carried by a same initial downlink BWP IE, the same initial downlink BWP IE includes a same common PDCCH configuration for the first type of UEs and the second type of UEs, and the same common PDCCH configuration has different parameter values for downlink access configurations of the first type of UEs and the second type of UEs.

As illustrated in FIG. 7, an apparatus for transmitting configuration information is provided according to an embodiment of the disclosure. The apparatus is applied in a user equipment (UE). The apparatus includes a receiving module 710.

The receiving module 710 is configured to receive configuration information sent by a base station, in which the confirmation information includes configuration information for a first type of UEs and configuration information for a second type of UEs. A maximum bandwidth supported by the first type of UEs is smaller than a maximum bandwidth supported by the second type of UEs. An access configuration of the first type of UEs indicated by the configuration information is independent of an access configuration of the second type of UEs indicated by the configuration information. The access configuration of the first type of UEs is configured to be used by the first type of UEs for network access, and the access configuration of the second type of UEs is configured to be used by the second type of UEs for network access.

In some embodiments, the receiving module 710 may be a program module. The program module is executed by a processor, to implement receiving independent configuration information respectively for the first type of UEs and the second type of UEs.

In some embodiments, the receiving module 710 may be a software and hardware combined module, which may include various programmable arrays, including but not limited to a complex programmable array or a field programmable array.

In further embodiments, the receiving module 710 may be a pure hardware module, which may include but be not limited to an application-specific integrated circuit.

In some embodiments, the access configuration of the first type of UEs being independent of the access configuration of the second type of UEs includes an initial access configuration of the first type of UEs being different from an initial access configuration of the second type of UEs.

In some embodiments, the initial access configuration includes an initial bandwidth part (BWP) configuration. The access configuration of the first type of UEs being independent of the access configuration of the second type of UEs includes: an initial BWP configuration of the first type of UEs being different from an initial BWP configuration of the second type of UEs; or the first type of UEs and the second type of UEs having a same initial BWP configuration indicating different access resources on a same initial BWP; or an initial BWP configuration of the first type of UEs and an initial BWP configuration of the second type of UEs being the same in part and different in the remaining part.

In some embodiments, the initial BWP configuration of the first type of UEs and the initial BWP configuration of the second type of UEs being the same in part and different in the remaining part includes: the initial BWP configuration of the first type of UEs and the initial BWP configuration of the second type of UEs having a same uplink initial BWP configuration and different downlink initial BWP configurations; or the initial BWP configuration of the first type of UEs and the initial BWP configuration of the second type of UEs having a same downlink initial BWP configuration and different uplink initial BWP configurations.

In some embodiments, the access configuration includes a random access configuration for random access. The access configuration of the first type of UEs indicated by the configuration information being independent of the access configuration of the second type of UEs includes a random access configuration of the first type of UEs being different from a random access configuration of the second type of UEs.

In some embodiments, the random access configuration includes a configuration of random access resources.

In some embodiments, the random access configuration includes a random access configuration for 2-step random access.

In some embodiments, the access configuration includes a paging configuration for sending a paging message.

The access configuration of the first type of UEs indicated by the configuration information being independent of the access configuration of the second type of UEs includes a paging configuration of the first type of UEs being different from a paging configuration of the second type of UEs.

In some embodiments, the paging configuration of the first type of UEs being different from the paging configuration of the second type of UEs includes a paging occasion for paging the first type of UEs indicated by the paging configuration of the first type of UEs being different from a paging occasion for paging the second type of UEs.

In some embodiments, receiving the configuration information sent by the base station includes receiving a system information block SIB1, in which the SIB1 carries the configuration information respectively for the first type of UEs and the second type of UEs.

In some embodiments, the configuration information for the first type of UEs and the configuration information for the second type of UEs indicate different uplink access configurations for access.

The SIB1 includes an initial uplink BWP information element (IE). The configuration information for the first type of UEs and the configuration information for the second type of UEs are carried by different initial uplink BWP IEs.

In some embodiments, the configuration information for the first type of UEs and the configuration information for the second type of UEs indicate different uplink access configurations for access. The SIB1 includes an initial uplink BWP information element (IE).

The configuration information for the first type of UEs and the configuration information for the second type of UEs are carried by a same initial uplink BWP IE, and the same initial uplink BWP IE includes different random access channel common configurations for the first type of UEs and the second type of UEs.

And/or the configuration information for the first type of UEs and the configuration information for the second type of UEs are carried by a same initial uplink BWP IE, and the same initial uplink BWP IE includes different physical uplink shared channel (PUSCH) random access message A (MsgA) configurations for the first type of UEs and the second type of UEs.

In some embodiments, the configuration information for the first type of UEs and the configuration information for the second type of UEs indicate different downlink access configurations for access. The SIB1 includes an initial downlink BWP information element (IE).

The configuration information for the first type of UEs and the configuration information for the second type of UEs are carried by different initial downlink BWP IEs.

Or, the configuration information for the first type of UEs and the configuration information for the second type of UEs are carried by a same initial downlink BWP IE, and the same initial downlink BWP IE includes different common physical downlink control channel (PDCCH) configurations for the first type of UEs and the second type of UEs.

Or, the configuration information for the first type of UEs and the configuration information for the second type of UEs are carried by a same initial downlink BWP IE, the same initial downlink BWP IE includes a same common PDCCH configuration for the first type of UEs and the second type of UEs, and the same common PDCCH configuration has different parameter values for downlink access configurations of the first type of UEs and the second type of UEs.

The embodiments of the disclosure further provide a communication device including a processor, a transceiver, a memory and executable programs running on the processor. When the processor runs the executable programs, the method for transmitting configuration information applied in the UE provided in any above mentioned technical solution or the method for transmitting configuration information applied in the base station provided in any above mentioned technical solution is performed.

The communication device may be the above mentioned base station or UE.

The processor may include various types of storage media, which are non-transitory computer storage media that can continue to memorize information stored thereon after the communication device is powered down. Here, the communication device includes a base station or user equipment The processor may be connected to the memory through a bus, etc., for reading the executable program stored in the memory, for example, to perform at least one of the methods shown in FIG. 2 or 5.

The embodiments of the disclosure further provide a computer storage medium stored with executable programs is provided. When the executable programs are executed by a processor, the method for transmitting configuration information according to any technical solution of the first aspect or the second aspect of the embodiments of the disclosure is performed, for example at least one of the methods shown in FIG. 2 or 5 is performed.

Some examples are provided in combination any one embodiment.

Example 1

Since the Redcap UE (i.e., the first type of UE) and eMBB UE (the second type of UE) have different properties, the commination requirements are different. The configuration solution introduced for the Light UE is mainly for RMSI (SIB1).

A special initial access configuration is configured for the Redcap UE, which is different from the initial access configuration of the eMBB UE. The initial access configuration may be indicated by configuration information. For example, the configuration information of the Redcap UE and the configuration information of the eMBB UE may be different in the level of initial BWP, so that the SIB1 includes different initial BWP IEs.

In one case, separate configuration information is configured for the Redcap UE in the RMSI (SIB1). The configuration information indicates an access configuration only applicable to the Redcap UE. The access configuration may include the initial access configuration, the random access configuration, and/or the paging configuration mentioned above.

Separate uplink access configuration is configured for the Redcap UE, i.e., the uplink access configuration of the Redcap UE is different from the uplink initial access configuration of the eMBB UE in the SIB1. For example, the uplink access configuration includes different configurations of uplink initial access bandwidth. The separate configuration is only effective to the Redcap UE.

In another case, the Redcap UE is not configured with separate uplink initial access bandwidth and configuration, but the IE where the configuration information of the eMBB UE is located is multiplexed. The configuration value of the configuration information for the Redcap UE is different from the configuration value of the configuration information for the eMBB UE in the corresponding IE. In other words, the same IE may carry different configuration values of the configuration information for the two types of UEs respectively.

Separate resource related to the random access is configured for the Redcap UE. Only the information required to be configured specially is carried by the SIB1. In this case, the configuration values of the random access resources configured for the two types of UEs are respectively carried in the SIB1.

The base station may configure addition downlink initial access bandwidth for the UE of R15 or R16 to replace the configuration in the PBCH. However, for the redcap UE, the bandwidth may exceed the maximum bandwidth (such as 20 MHz). Thus, a separate initial access bandwidth (not exceeding the maximum bandwidth) may be configured for the Redcap UE, or the configuration is not changed but judged by the UE itself. When the configured additional initial access bandwidth exceeds the bandwidth of the UE, the UE determines that the configuration is not effective to itself.

In the separate initial downlink BWP configuration, a separate paging resource may be configured for the UE, i.e., paging resource dedicated to the Redcap UE. The configuration may be PCCH-Config for Redcap.

These configurations are also applicable in other related RRC signalings citing the same IE.

Example 2

The random access configuration for the Redcap is optimized. The optimization methods include the followings.
First Optimization Method If the Redcap UE and the UE of R15 or R16 multiplex the same initial bandwidth, a separate random access configuration may be configured for the Redcap UE. The separate random access configuration may make the Redcap UE and the UE of R15 or R16 have different random access resources or random access parameters.

For example, the specific configuration may include a time-frequency resource for the random access and a configuration indicating whether the Redcap UE supports the 2-step random access.

For another example, the specific time-frequency resource for the random access refers to a separate RO configured for the Redcap UE, i.e., different PRACH resource indexes.

For example, the RACH resource for the 2-step or 4-step random access is configured based on whether the network side device (wireless network element such as base station, or access management function element or the like) would like the Redcap UE to support the 2-step random access. If the network side device would not like the Redcap UE to support the 2-step random access, only the 4-step random access resource separately applicable to the Redcap UE is configured in the random access configuration. In this way, the random access of the Redcap UE can be controlled without affecting the eMBB UE.

In some cases, if the Redcap UE supports the 2-step random access, a separate MSC may be configured to the MsgB.

By means of the above configurations, the configuration of the RACH related physical resources separately for the NR Redcap UE includes: the random access occasion (RO) and whether to support 2-step.

Further, if the Redcap UEs are classified into different types, the above configurations may be supplemented with configurations for subclasses. For example, two subclasses, two set of required parameters are configured, and one set of other parameters is included.

Second Optimization Method

The separate initial access bandwidth configured for the Redcap UE is smaller than the maximum initial bandwidth of the eMBB UE, the configuration information of the first type of UEs is separately configured in the initial BWP IE of the SIB1.

Figure 8:
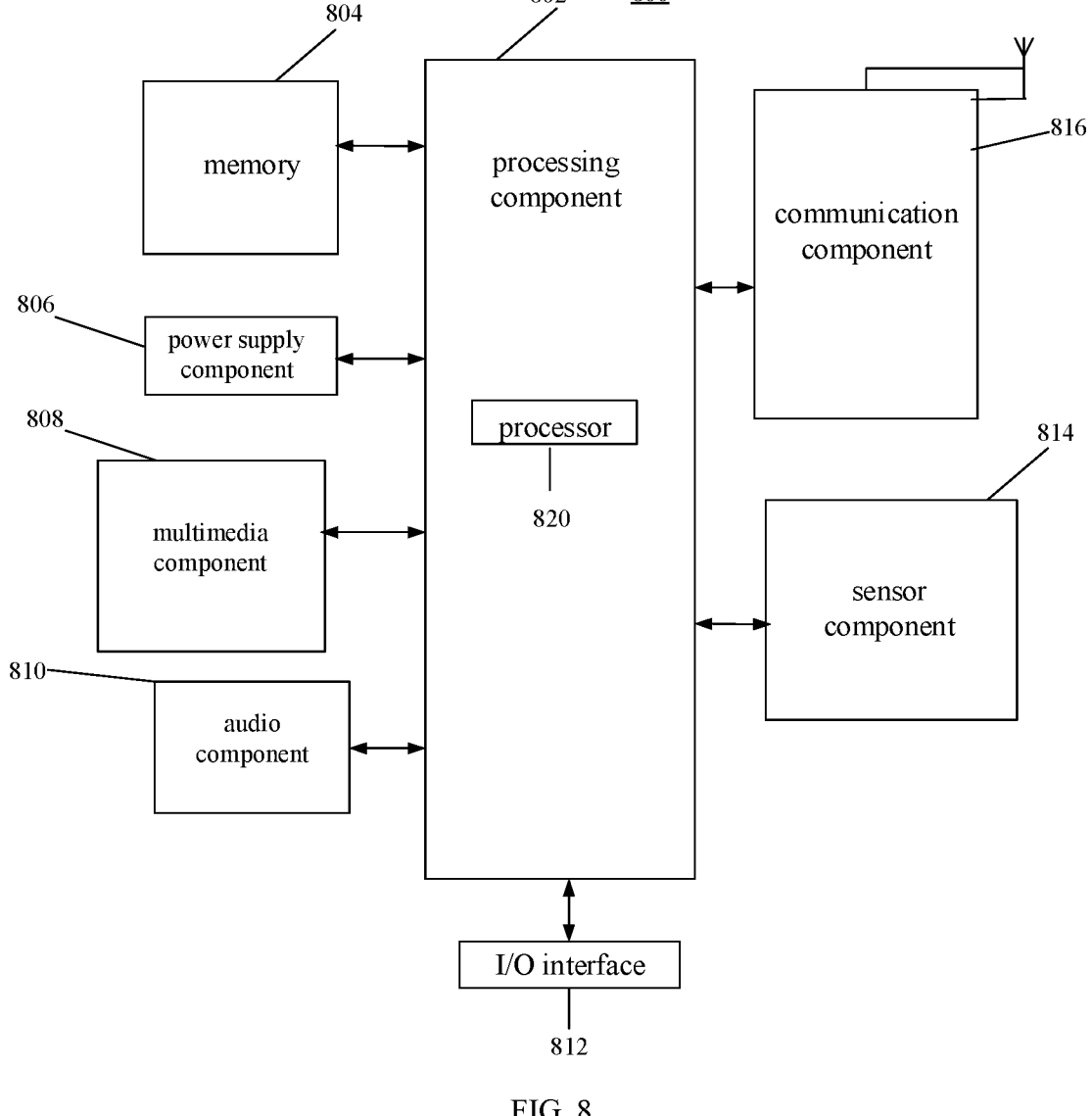
FIG. 8 is a block diagram illustrating a UE according to an embodiment.

FIG. 8 is a block diagram illustrating a UE 800 according to an embodiment. For example, the UE 800 may be a mobile phone, a computer, a digital broadcasting UE, a messaging device, a game console, a tablet device, a medical equipment, a fitness equipment, a personal digital assistant, and so on.

Referring to FIG. 8, the UE 800 may include one or more components of the followings: a processing component 802, a memory 804, a power supply component 806, a multimedia component 808, an audio component 810, an input/output (I/O) interface 812, a sensor component 814, and a communication component 816.

The processing component 802 generally controls the whole operation of the UE 800, such as the operations related to display, phone call, data communication, camera operation and recording operation. The processing component 802 may include one or more processors 820 to perform instructions, to complete all or part of blocks of the above method. In addition, the processing component 802 may include one or more modules for the convenience of interaction between the processing component 802 and other components. For example, the processing component 802 may include a multimedia module for the convenience of interaction between the multimedia component 808 and the processing component 802.

The memory 804 is configured to store all types of data to support the operation of the UE 800. Examples of the data include the instructions of any applications or methods operated on the UE 800, contact data, phone book data, messages, pictures, videos, etc. The memory 804 may be implemented by any type of temporary or non-temporary storage devices or their combination, such as a static random access memory (SRAM), an electrically erasable programmable read-only memory (EEPROM), an electrically programmable read-only memory (EPROM), a programmable read-only memory (PROM), a read-only memory (ROM), a magnetic memory, a flash memory, a magnetic disk or an optical disk.

The power supply component 806 may provide power for all components of the UE 800. The power supply component 806 may include a power supply management system, one or more power supplies, and other units related to generating, managing and distributing power for the UE 800.

The multimedia component 808 includes an output interface screen provided between the UE 800 and the user. In some embodiments, a screen may include a liquid crystal display (LCD) and a touch panel (TP). When the screen includes a TP, the screen may be implemented as a touch screen to receive an input signal from the user. The touch panel includes one or more touch sensors to sense touching, sliding and gestures on the touch panel. The touch sensor may not only sense the boundary of a touch or slide action, but also detect the duration and pressure related to the touch or slide operation. In some embodiments, the multimedia component 808 includes a front camera and/or a rear camera. When the UE 800 is in an operation mode, such as a shooting mode or a video mode, the front camera or the rear camera may receive the external multimedia data. Each front camera and rear camera may be a fixed optical lens system or an optical lens system with a focal length and an optical zoom capacity.

The audio component 810 is configured to output and/or input an audio signal. For example, the audio component 810 includes a microphone (MIC). When the UE 800 is in an operation mode, such as a call mode, a record mode, and a speech recognition mode, the microphone is configured to receive the external audio signal. The received audio signal may be further stored in the memory 804 or sent via the communication component 816. In some embodiments, the audio component 810 further includes a speaker configured to output an audio signal.

The I/O interface 812 provides an interface for the processing component 802 and the peripheral interface module, and the peripheral interface module may be a keyboard, a click wheel, a button, etc. The button may include but not limited to a home button, a volume button, a start button and a lock button.

The sensor component 814 includes one or more sensors, configured to provide various aspects of status assessment for the UE 800. For example, the sensor component 814 may detect the on/off state of the UE 800 and the relative positioning of the component. For example, the component is a display and a keypad of the UE 800. The sensor component 814 may further detect the location change of the UE 800 or one component of the UE 800, the presence or absence of contact between the user and the UE 800, the orientation or acceleration/deceleration of the UE 800, and the temperature change of the UE 800. The sensor component 814 may include a proximity sensor configured to detect the existence of the objects nearby without any physical contact. The sensor component 814 may further include a light sensor such as a complementary metal oxide semiconductor (CMOS) or a charge-coupled device (CCD) image sensor, which is configured to use in imaging applications. In some embodiments, the sensor component 814 may further include an acceleration transducer, a gyroscope sensor, a magnetic sensor, a pressure sensor or a temperature sensor.

The communication component 816 is configured for the convenience of wire or wireless communication between the UE 800 and other devices. The terminal 800 may access wireless networks based on communication standard, such as Wi-Fi, 2G or 3G, or their combination. In an embodiment, the communication component 816 receives broadcast signals or broadcast-related information from an external broadcast management system via a broadcast channel. In an embodiment, the communication component 816 further includes a near field communication (NFC) module to facilitate short-range communication. For example, the NFC module may be achieved based on a radio frequency identification (RFID) technology, an infrared data association (IrDA) technology, an ultra-wide band (UWB) technology, a blue tooth (BT) technology and other technologies.

In an embodiment, the UE 800 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components, which is configured to perform the above methods.

In an embodiment, a non-transitory computer-readable storage medium is further provided which includes executable instructions, such as the memory 804 including executable instructions, the executable instructions may be executed by the processor 820 of the UE 800 to complete the above methods. For example, the non-transitory computer-readable storage medium may be a ROM, a random access memory (RAM), a CD-ROM, a magnetic tape, a floppy disk, an optical data storage device, etc.

Figure 9:
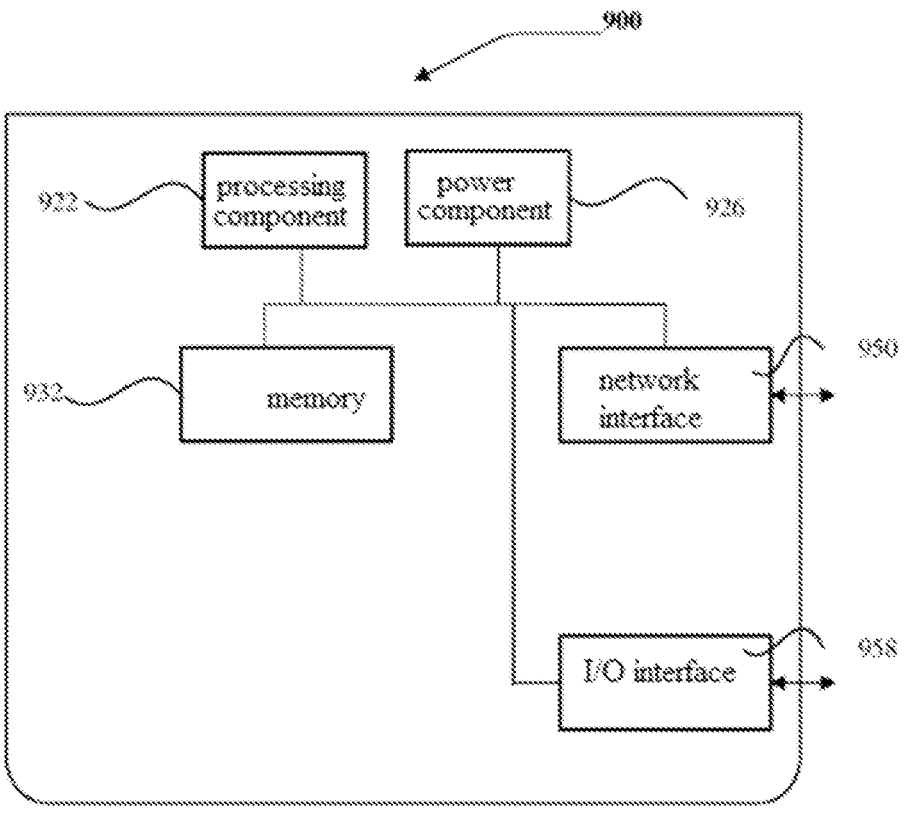
FIG. 9 is a block diagram illustrating a base station according to an embodiment.

FIG. 9 is a block diagram illustrating a base station 900 according to an embodiment. The base station 900 may be provided as a network side device. As illustrated in FIG. 9, the base station 900 includes a processing component 922, which further includes one or more processors, and a memory resource represented by a memory 932, for storing instructions executable by the processing component 922, such as an application program. The application program stored in the memory 932 may include one or more modules each corresponding to a set of instructions. In addition, the processing component 922 is configured to execute the instructions to perform any of the methods described with reference to FIG. 2, FIG. 3.

The base station 900 may also include a power component 926 configured to perform power management of the base station 900, a wired or wireless network interface 950 configured to connect the base station 900 to a network, and an input output (I/O) interface 958. The base station 900 can operate based on an operating system stored in the memory 932, such as Windows Server™, Mac OS X™, UnixT™, Linux™, FreeBSD™ or the like.

The wireless network interface 950 includes but is not limited to the antenna in the above described communication device. After considering the specification and practicing the disclosure herein, those skilled in the art will easily think of other implementations. The disclosure is intended to cover any variations, usages, or adaptive changes of the disclosure. These variations, usages, or adaptive changes follow the general principles of the disclosure and include common knowledge or conventional technical means in the technical field not disclosed by the disclosure. The description and the embodiments are to be regarded as exemplary only, and the true scope and spirit of the disclosure are given by the appended claims.

It should be understood that the disclosure is not limited to the precise structure described above and shown in the drawings, and various modifications and changes may be made without departing from its scope. The scope of the present disclosure is only limited by the appended claims.

What is claimed is:

1. A method for transmitting configuration information, comprising:

sending, by a base station, configuration information respectively for a first type of user equipments (UEs) and a second type of UEs; wherein the configuration information for the first type of UEs and the configuration information for the second type of UEs comprise an initial bandwidth part (BWP) configuration;

wherein a first access configuration of the first type of UEs indicated by the configuration information is independent of a second access configuration of the second type of UEs indicated by the configuration information;

the first access configuration of the first type of UEs is configured to be used by the first type of UEs for network access, and the second access configuration of the second type of UEs is configured to be used by the second type of UEs for network access;

wherein sending the configuration information respectively for the first type of UEs and the second type of UEs comprises:

sending a system information block SIB1, wherein the SIB1 carries the configuration information respectively for the first type of UEs and the second type of UEs;

wherein the first access configuration information for the first type of UEs and the second access configuration information for the second type of UEs indicate different uplink access configurations for access;

wherein the SIB1 comprises an initial uplink BWP information element (IE);

the first access configuration information for the first type of UEs and the second access configuration information for the second type of UEs are carried in any of the following:

different initial uplink BWP IEs;

a same initial uplink BWP IE, wherein the same initial uplink BWP IE comprises different random access channel common configurations for the first type of UEs and the second type of UEs;

a same initial uplink BWP IE, wherein the same initial uplink BWP IE comprises different physical uplink shared channel (PUSCH) random access message A (MsgA) configurations for the first type of UEs and the second type of UEs, wherein the MsgA is a random access message for a 2-step random access process.

2. The method of claim 1, wherein the first access configuration of the first type of UEs being independent of the second access configuration of the second type of UEs comprises:

a first initial-access configuration of the first type of UEs being different from a second initial-access configuration of the second type of UEs.

3. The method of claim 2, wherein the first access configuration of the first type of UEs being independent of the second access configuration of the second type of UEs comprises one of the following:

a first initial BWP configuration of the first type of UEs being different from a second initial BWP configuration of the second type of UEs;

the first type of UEs and the second type of UEs having a same initial BWP configuration indicating different access resources on a same initial BWP;

a first initial BWP configuration of the first type of UEs and a second initial BWP configuration of the second type of UEs being the same in part and different in the remaining part.

4. The method of claim 3, wherein the first initial BWP configuration of the first type of UEs and the second initial BWP configuration of the second type of UEs being the same in part and different in the remaining part comprises one of the following:

the first initial BWP configuration of the first type of UEs and the second initial BWP configuration of the second type of UEs having a same uplink initial BWP configuration and different downlink initial BWP configurations; or the first initial BWP configuration of the first type of UEs and the second initial BWP configuration of the second type of UEs having a same downlink initial BWP configuration and different uplink initial BWP configurations.

5. The method of claim 1, wherein the first access configuration and the second access configuration comprise a random access configuration for random access;

wherein the first access configuration of the first type of UEs indicated by the configuration information being independent of the second access configuration of the second type of UEs comprises:

a first random access configuration of the first type of UEs being different from a second random access configuration of the second type of UEs.

6. The method of claim 1, wherein the first access configuration and the second access configuration comprise a paging configuration for sending a paging message;

wherein the first access configuration of the first type of UEs indicated by the configuration information being independent of the second access configuration of the second type of UEs comprises:

a first paging configuration of the first type of UEs being different from a second paging configuration of the second type of UEs.

7. The method of claim 6, wherein the first paging configuration of the first type of UEs being different from the second paging configuration of the second type of UEs comprises:

a first paging occasion for paging the first type of UEs indicated by the first paging configuration of the first type of UEs being different from a second paging occasion for paging the second type of UEs.

8. The method of claim 1, wherein the first access configuration information for the first type of UEs and the second access configuration information for the second type of UEs further indicate different downlink access configurations for access;

wherein the SIB1 further comprises an initial downlink BWP IE;

the first access configuration information for the first type of UEs and the second access configuration information for the second type of UEs are further carried in any of the following:

different initial downlink BWP IEs;

a same initial downlink BWP IE, wherein the same initial downlink BWP IE comprises different common physical downlink control channel (PDCCH) configurations for the first type of UEs and the second type of UEs;

a same initial downlink BWP IE, wherein the same initial downlink BWP IE comprises a same common PDCCH configuration for the first type of UEs and the second type of UEs, and the same common PDCCH configuration has different parameter values for downlink access configurations of the first type of UEs and the second type of UEs.

9. A method for transmitting configuration information, comprising:

receiving, by a user equipment (UE), configuration information sent by a base station, wherein the confirmation information comprises configuration information for a first type of UEs and configuration information for a second type of UEs; wherein the configuration information for the first type of UEs and the configuration information for the second type of UEs comprise an initial bandwidth part (BWP) configuration;

wherein a first access configuration of the first type of UEs indicated by the configuration information is independent of a second access configuration of the second type of UEs indicated by the configuration information;

the first access configuration of the first type of UEs is configured to be used by the first type of UEs for network access, and the second access configuration of the second type of UEs is configured to be used by the second type of UEs for network access;

wherein receiving the configuration information sent by the base station comprises:

receiving a system information block SIB1, wherein the SIB1 carries the configuration information respectively for the first type of UEs and the second type of UEs;

wherein the first access configuration information for the first type of UEs and the second access configuration information for the second type of UEs indicate different uplink access configurations for access;

wherein the SIB1 comprises an initial uplink BWP information element (IE);

the first access configuration information for the first type of UEs and the second access configuration information for the second type of UEs are carried in any of the following:

different initial uplink BWP IEs;

a same initial uplink BWP IE, wherein the same initial uplink BWP IE comprises different random access channel common configurations for the first type of UEs and the second type of UEs;

a same initial uplink BWP IE, wherein the same initial uplink BWP IE comprises different physical uplink shared channel (PUSCH) random access message A (MsgA) configurations for the first type of UEs and the second type of UEs, wherein the MsgA is a random access message for a 2-step random access process.

10. The method of claim 9, wherein the first access configuration of the first type of UEs being independent of the second access configuration of the second type of UEs comprises:

a first initial access configuration of the first type of UEs being different from a second initial access configuration of the second type of UEs.

11. The method of claim 10, wherein the first access configuration of the first type of UEs being independent of the second access configuration of the second type of UEs comprises one of the followings:

a first initial BWP configuration of the first type of UEs being different from a second initial BWP configuration of the second type of UEs;

the first type of UEs and the second type of UEs having a same initial BWP configuration indicating different access resources on a same initial BWP;

a first initial BWP configuration of the first type of UEs and a second initial BWP configuration of the second type of UEs being the same in part and different in the remaining part.

12. The method of claim 11, wherein the first initial BWP configuration of the first type of UEs and the second initial BWP configuration of the second type of UEs being the same in part and different in the remaining part comprises one of the following:

the first initial BWP configuration of the first type of UEs and the second initial BWP configuration of the second type of UEs having a same uplink initial BWP configuration and different downlink initial BWP configurations;

the first initial BWP configuration of the first type of UEs and the second initial BWP configuration of the second type of UEs having a same downlink initial BWP configuration and different uplink initial BWP configurations.

13. The method of claim 9, wherein the first access configuration and the second access configuration comprise a random access configuration for random access;

wherein the first access configuration of the first type of UEs indicated by the configuration information being independent of the second access configuration of the second type of UEs comprises:

a first random access configuration of the first type of UEs being different from a second random access configuration of the second type of UEs.

14. The method of claim 9, wherein the first access configuration and the second access configuration comprise a paging configuration for sending a paging message;

wherein the first access configuration of the first type of UEs indicated by the configuration information being independent of the second access configuration of the second type of UEs comprises:

a first paging configuration of the first type of UEs being different from a second paging configuration of the second type of UEs.

15. The method of claim 14, wherein the first paging configuration of the first type of UEs being different from the second paging configuration of the second type of UEs comprises:

a first paging occasion for paging the first type of UEs indicated by the first paging configuration of the first type of UEs being different from a second paging occasion for paging the second type of UEs.

16. The method of claim 9, wherein the first access configuration information for the first type of UEs and the second access configuration information for the second type of UEs further indicate different downlink access configurations for access;

wherein the SIB1 further comprises an initial downlink BWP IE;

the first access configuration information for the first type of UEs and the second access configuration information for the second type of UEs are further carried in any of the following:

different initial downlink BWP IEs;

a same initial downlink BWP IE, wherein the same initial downlink BWP IE comprises different common physical downlink control channel (PDCCH) configurations for the first type of UEs and the second type of UEs;

a same initial downlink BWP IE, wherein the same initial downlink BWP IE comprises a same common PDCCH configuration for the first type of UEs and the second type of UEs, and the same common PDCCH configuration has different parameter values for downlink access configurations of the first type of UEs and the second type of UEs.

17. A communication device, comprising: a processor, a transceiver, a memory and executable programs running on the processor;

wherein when the processor runs the executable programs, the processor is caused to perform the followings:

sending configuration information respectively for a first type of user equipments (UEs) and a second type of UEs; wherein the configuration information for the first type of UEs and the configuration information for the second type of UEs comprise an initial bandwidth part (BWP) configuration;

wherein a first access configuration of the first type of UEs indicated by the configuration information is independent of a second access configuration of the second type of UEs indicated by the configuration information;

the first access configuration of the first type of UEs is configured to be used by the first type of UEs for network access, and the second access configuration of the second type of UEs is configured to be used by the second type of UEs for network access;

wherein sending the configuration information respectively for the first type of UEs and the second type of UEs comprises:

sending a system information block SIB1, wherein the SIB1 carries the configuration information respectively for the first type of UEs and the second type of UEs;

wherein the first access configuration information for the first type of UEs and the second access configuration information for the second type of UEs indicate different uplink access configurations for access;

wherein the SIB1 comprises an initial uplink BWP information element (IE);

the first access configuration information for the first type of UEs and the second access configuration information for the second type of UEs are carried in any of the following:

different initial uplink BWP IEs;

a same initial uplink BWP IE, wherein the same initial uplink BWP IE comprises different random access channel common configurations for the first type of UEs and the second type of UEs;

a same initial uplink BWP IE, wherein the same initial uplink BWP IE comprises different physical uplink shared channel (PUSCH) random access message A (MsgA) configurations for the first type of UEs and the second type of UEs, wherein the MsgA is a random access message for a 2-step random access process.

* * * * *